US010364773B2

(12) United States Patent
Baralon

(10) Patent No.: US 10,364,773 B2
(45) Date of Patent: Jul. 30, 2019

(54) GAS TURBINE ENGINE

(71) Applicant: ROLLS-ROYCE plc, London (GB)

(72) Inventor: Stephane M M Baralon, Derby (GB)

(73) Assignee: ROLLS-ROYCE plc, London (GB)

( * ) Notice: Subject to any disclaimer, the term of this patent is extended or adjusted under 35 U.S.C. 154(b) by 302 days.

(21) Appl. No.: 15/298,927

(22) Filed: Oct. 20, 2016

(65) Prior Publication Data

US 2017/0145958 A1    May 25, 2017

(30) Foreign Application Priority Data

Nov. 20, 2015 (GB) .................................. 1520451.4

(51) Int. Cl.
| | | |
|---|---|---|
| *F04D 29/54* | (2006.01) | |
| *F02K 3/06* | (2006.01) | |
| *B64D 27/18* | (2006.01) | |
| *F04D 29/32* | (2006.01) | |

(52) U.S. Cl.
CPC ................ *F02K 3/06* (2013.01); *B64D 27/18* (2013.01); *F04D 29/325* (2013.01); *F04D 29/542* (2013.01); *F04D 29/544* (2013.01); *F05D 2220/32* (2013.01); *F05D 2240/121* (2013.01); *F05D 2250/70* (2013.01); *F05D 2250/71* (2013.01); *F05D 2250/711* (2013.01); *F05D 2250/712* (2013.01)

(58) Field of Classification Search
CPC ............. F04D 29/541; F05D 2240/121; F05D 2240/126; F05D 2250/184; F05D 2250/185; F01D 9/041; F01D 5/141; F02K 3/06

See application file for complete search history.

(56) References Cited

U.S. PATENT DOCUMENTS 6,145,300 A * 11/2000 Romani ................... F01D 5/141
                                                    415/199.4
6,195,983 B1 * 3/2001 Wadia ..................... F01D 5/141
                                                    415/208.1

(Continued)

FOREIGN PATENT DOCUMENTS

| EP | 2169182 A2 | 3/2010 |
|---|---|---|
| EP | 2735708 A1 | 5/2014 |

(Continued)

OTHER PUBLICATIONS

Mar. 15, 2016 Search Report issued in Great Britain Patent Application No. 1520451.4.

*Primary Examiner* — Dwayne J White
*Assistant Examiner* — Wesley Le Fisher
(74) *Attorney, Agent, or Firm* — Oliff PLC

(57) ABSTRACT

A gas turbine engine comprising a fan, a bypass duct positioned downstream of the fan and defined by an inner casing and an outer casing, a series of outlet guide vanes arranged downstream of the fan, the outlet guide vanes extending between the inner casing and the outer casing of the bypass duct; and a bifurcation positioned downstream of the outlet guide vanes and extending between the inner casing and the outer casing. The bifurcation comprises a leading edge, and the leading edge of the bifurcation is shaped so as to protrude axially forward by a varying distance from the inner casing to the outer casing so as to improve uniformity of a static pressure field formed, in use, immediately upstream of the bifurcation.

16 Claims, 4 Drawing Sheets

(56) References Cited

U.S. PATENT DOCUMENTS

| | | | |
|---|---|---|---|
| 6,905,307 B2* | 6/2005 | Kawarada | F01D 5/141 29/557 |
| 9,441,502 B2* | 9/2016 | Gbadebo | F01D 5/141 |
| 2012/0020804 A1* | 1/2012 | Bahadur | F01D 5/141 416/241 R |
| 2012/0315136 A1* | 12/2012 | Sonoda | F04D 29/526 415/210.1 |
| 2013/0016448 A1 | 1/2013 | George et al. | |
| 2013/0164488 A1* | 6/2013 | Wood | F04D 29/324 428/80 |
| 2016/0003095 A1* | 1/2016 | Romano | F01D 5/141 415/1 |
| 2017/0145840 A1* | 5/2017 | Di Mare | F01D 9/041 |
| 2017/0159442 A1* | 6/2017 | Velazquez, Jr. | B64C 21/10 |

FOREIGN PATENT DOCUMENTS

| | | |
|---|---|---|
| GB | 1256122 A | 12/1971 |
| WO | 00/03136 A1 | 1/2000 |
| WO | 2014/051662 A1 | 4/2014 |

\* cited by examiner

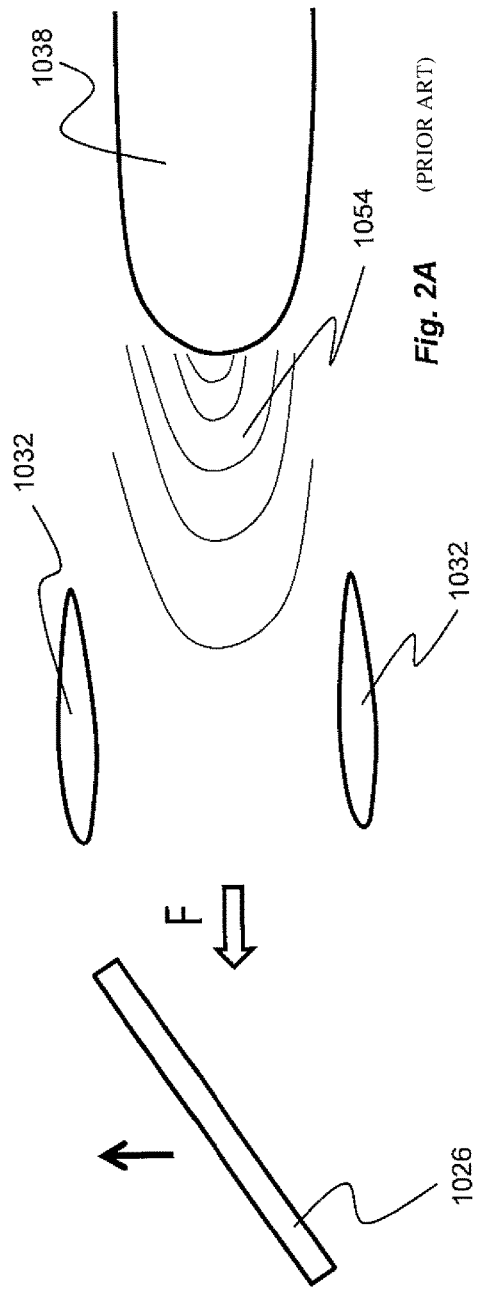
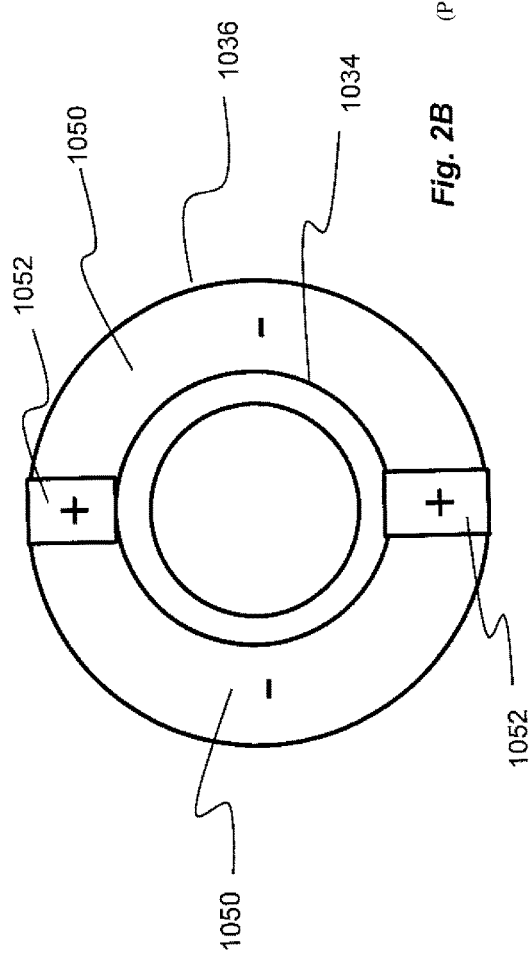
Fig. 2A (PRIOR ART)
Fig. 2B (PRIOR ART)

GAS TURBINE ENGINE

TECHNICAL FIELD

The present disclosure relates to a gas turbine engine, in particular a gas turbine engine having in axial flow series a fan, a series of outlet guide vanes and a bifurcation.

BACKGROUND

Turbofan gas turbine engines (which may be referred to simply as 'turbofans') are typically employed to power aircraft. Turbofans are particularly useful on commercial aircraft where fuel consumption is a primary concern. Referring to FIG. 1, typically a turbofan gas turbine engine 1010 will comprise an axial fan 1012 driven by an engine core 1015. The engine core is generally made up of one or more turbines which drive respective compressors via coaxial shafts. The fan is usually driven off an additional lower pressure turbine in the engine core.

The turbofan gas turbine engine 1010 is generally provided with outlet guide vanes (OGVs) 1032 downstream of the fan 1012 for straightening flow from the fan. Typically one or two bifurcations 1038 are provided downstream of the OGVs between the inner and outer walls of the bypass duct. The bifurcations include aerodynamically shaped fairings around the pylon structure for the purpose of encasing and directing electrical connections. Usually one bifurcation is positioned between the engine core 1015 and the outer casing at a position near a pylon 1008 that mounts the engine to the wing of an aircraft. If two bifurcations are provided, the second bifurcation is generally positioned diametrically opposite the bifurcation shown in FIG. 1.

However, the bifurcation provides a substantial and undesirable blockage to the flow downstream of the OGVs. This means that part of the flow from the OGVs stagnates at the bifurcation leading edge. The stagnated flow reaches a high static pressure equal to the incoming total pressure, also called stagnation pressure. The remaining flow from the OGVs flows around the bifurcation which results in acceleration, hence a reduction in pressure. The resulting high leading edge stagnation pressure and the low pressure around the area of high pressure bring a significant peak-to-peak variation in the static pressure field seen from the OGV trailing-edge.

This problem is illustrated in FIGS. 2A and 2B. Referring to FIG. 2A, the static pressure field is indicated at 1054 and the resulting force on the fan is indicated by arrow F. Referring to FIG. 2B, the region between the bifurcation 1038 and the OGVs 1032 (both shown in FIG. 2A) is illustrated. As can be seen in FIG. 2B, an area of high static pressure 1052 is formed in a region corresponding to the position of the two bifurcations, and an area of low pressure 1050 is formed in a region corresponding to a position between (i.e. away from) the two bifurcations. The high peak-to-peak static pressure variation downstream of the OGV can alter the OGV row aerodynamics and exert a significant force on the fan blades 1026 for each revolution of the fan. Furthermore, the radial distribution of the pressure field emanating from the bifurcation leading edge has, once transferred through the OGV passages, an influence on which mode shapes of the fan blade are being predominantly excited.

One method of addressing this problem is to alter the stagger angle and/or camber of the OGVs to reduce the peak-to-peak variation in the static pressure field upstream of the OGV and to adapt to the varying back pressure. However, altering the stagger angle of the OGVs can reduce aerodynamic efficiency by introducing increased pressure losses due to excessive flow diffusion.

SUMMARY

The present disclosure seeks to provide a gas turbine engine where a balance is reached between minimising the forcing on the fan blades in its amplitude and radial content while maximising the aerodynamic efficiency of the OGVs.

In a first aspect there is provided a gas turbine engine comprising a fan, a bypass duct positioned downstream of the fan and defined by an inner casing and an outer casing, a series of outlet guide vanes arranged downstream of the fan, the outlet guide vanes extending between the inner casing and the outer casing of the bypass duct, and a bifurcation positioned downstream of the outlet guide vanes and extending between the inner casing and the outer casing, wherein the bifurcation comprises a leading edge. The leading edge of the bifurcation is shaped so as to protrude axially forward by a varying distance along the radial extent of the leading edge so as to modify a static pressure field formed, in use, immediately upstream of the bifurcation.

The inventor has found that the leading edge of the bifurcation can be profiled so that the static pressure field in front of the bifurcation is more uniform. A more uniform static pressure field reduces the forcing on and therefore the vibration of, the fan blades. The leading edge can also be profiled so as to reduce the excitation of specific modes of vibration during rotation of the fan.

For example, the leading edge may be considered to protrude from a nominal straight line profile extending from the inner casing to the outer casing.

The leading edge may be profiled such that the distance of the leading edge from a datum line varies from a position adjacent the inner casing to a position adjacent the outer casing. The distance from the leading edge to the datum line may be measured using a direct distance from one point on the leading edge to a directly axially opposite point on the datum. The datum line may be a radial straight line extending directly from the inner casing to the outer casing at a rearward-most position along the leading edge.

The leading edge may extend axially forward by a varying distance from the inner casing to the outer casing.

The leading edge may be profiled such that the chordal length of the bifurcation varies from the inner casing to the outer casing of the bifurcation.

As will be understood in the art, the chordal length refers to the length measured directly from a point on the trailing edge to a directly opposite point on the leading edge.

In the present application, as is conventional in the art, a spanwise direction refers to a direction extending radially between the inner and outer casing, and a chordal direction refers to a direction extending between the leading edge and the trailing edge of the bifurcation.

The leading edge of the bifurcation may be profiled such that the distance the leading edge axially protrudes varies with a variation of static pressure that would otherwise be formed immediately upstream of the bifurcation (e.g. the static pressure that would be seen if the leading edge were substantially straight and free from protrusions). For example, the chordal length of the bifurcation may vary with a variation of static pressure immediately upstream of the bifurcation.

The leading edge of the bifurcation may be profiled so as to protrude axially forward by a maximum distance (or have a maximum chordal length) in regions where the static pressure immediately upstream of the bifurcation is a minimum.

The leading edge of the bifurcation may be profiled so as to protrude axially forward by a minimum distance (or have a minimal chordal length) in regions where the static pressure immediately upstream of the bifurcation is a maximum.

Protrusion of the leading edge may be considered as protrusion from a nominal straight profile aligned with the leading edge at a position of minimal protrusion.

The leading edge of the bifurcation may be profiled so as to protrude axially forward by a maximum distance at a position adjacent the inner casing and the outer casing.

The leading edge of the bifurcation may be profiled so as to protrude axially forward by a minimum distance at a radially central region of the bifurcation.

The leading edge may be curved. The leading edge may include convex and concave surfaces. The leading edge may be defined by a convex curve at a position adjacent to the inner casing and/or at a position adjacent to the outer casing. The leading edge may include a concave surface mid-way between the inner and outer casing. The leading edge may comprise a plurality of concave and convex surfaces.

The bifurcation may have an aerofoil shape. The bifurcation may have two axial sides extending from the leading edge to the trailing edge. The profile of the bifurcation in the region of the leading edge may be curved from one axial side to the other. For example, the curve may be substantially parabolic.

The trailing edge of the bifurcation may be substantially straight.

The trailing edge of the bifurcation may extend directly between the inner casing and the outer casing.

The radial shape of the bifurcation may be defined by a spline passing through equal to or between 3 and 10 radial nodes of a uniform or non-uniform distribution of chordal protrusions. The chordal protrusions may protrude approximately by a distance up to 40% of the radial height of the bifurcation, for example by a distance equal to or greater than 5%, 10%, 15% or 20% of the height of the bifurcation.

In a second aspect there is provided a gas turbine engine comprising a fan, a bypass duct positioned downstream of the fan and defined by an inner casing and an outer casing, a series of outlet guide vanes arranged downstream of the fan, the outlet guide vanes extending between the inner casing and the outer casing of the bypass duct, and a bifurcation positioned downstream of the outlet guide vanes and extending between the inner casing and the outer casing, wherein the bifurcation comprises a leading edge. The leading edge of the bifurcation is shaped such that the leading edge protrudes axially forward by a varying distance from the inner casing to the outer casing so as to improve uniformity of a static pressure field formed, in use, immediately upstream of the bifurcation.

A distance of a protrusion may be measured with reference to a nominal straight profile at a rearward-most position along the leading edge.

In a third aspect there is provided a bifurcation for the gas turbine engine of the first or second aspect.

In a fourth aspect there is provided a method of manufacturing a gas turbine engine having a fan, a series of outlet guide vanes and a bifurcation. The method comprising defining the static pressure profile immediately upstream of a bifurcation (e.g. between the bifurcation and the outlet guide vanes) that has a substantially straight leading edge; and profiling the leading edge of the bifurcation such that the leading edge of the bifurcation extends more axially forward in regions where the defined static pressure profile of the substantially straight leading edge is a minimum.

The gas turbine engine manufactured using the method of the fourth aspect may be a gas turbine engine of the first or second aspects.

In a fifth aspect there is provided a method of manufacturing a gas turbine engine having a fan, a series of outlet guide vanes and a bifurcation. The method comprising defining a desired static pressure profile immediately upstream of a bifurcation (e.g. between the bifurcation and the outlet guide vanes); and profiling the leading edge of the bifurcation such that the leading edge of the bifurcation extends more axially forward in regions where a lower static pressure is desired and extending less axially forward in regions where a higher static pressure is desired.

The gas turbine engine manufactured using the method of the fifth aspect may be a gas turbine engine of the first or second aspects.

DESCRIPTION OF DRAWINGS

The invention will now be described, by way of example only, with reference to the accompanying drawings in which:

FIG. 2A illustrates a partial plan view of a fan blade, outlet guide vanes and bifurcation of the engine of FIG. 1;

FIG. 2B illustrates a static pressure profile circumferentially around a bypass duct of the engine of FIG. 1 in the region of the bifurcation;

DETAILED DESCRIPTION

Figure 1:
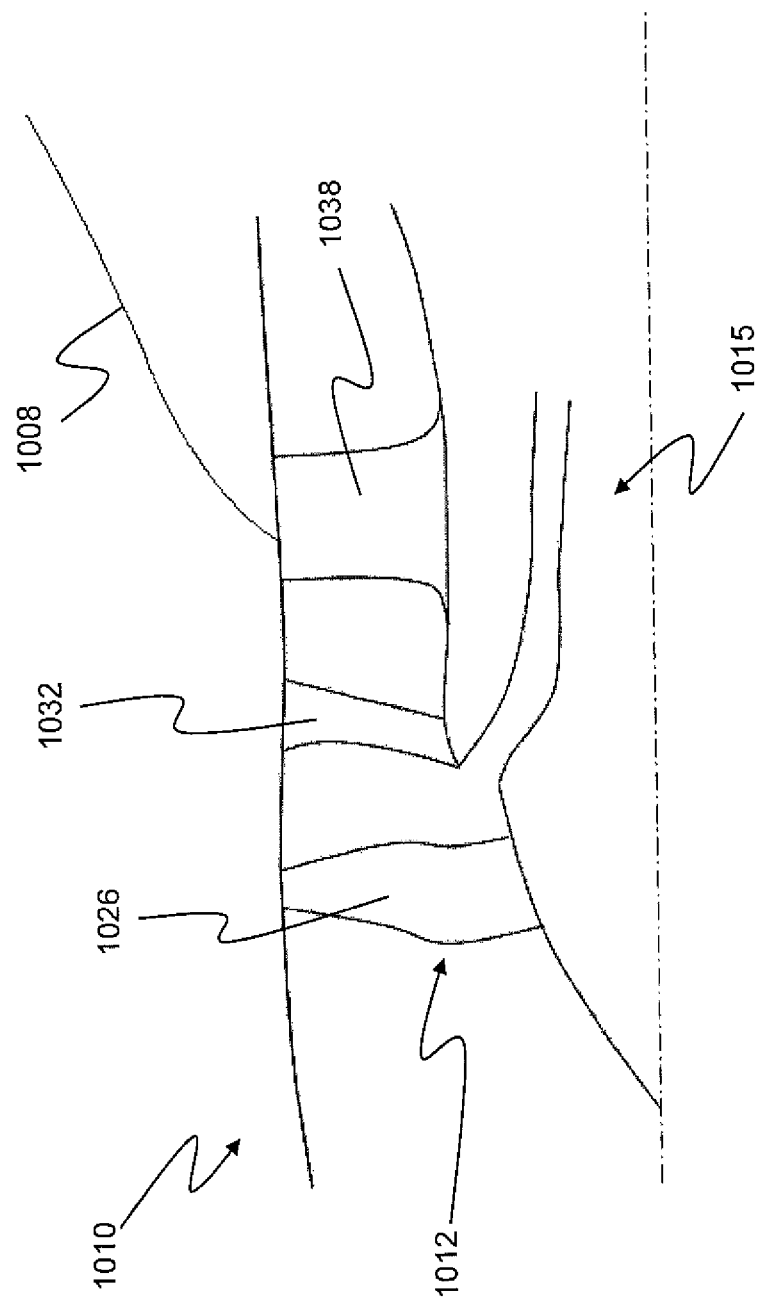
FIG. 1 illustrates a section of a portion of a gas turbine engine of the prior art.
Figure 3:
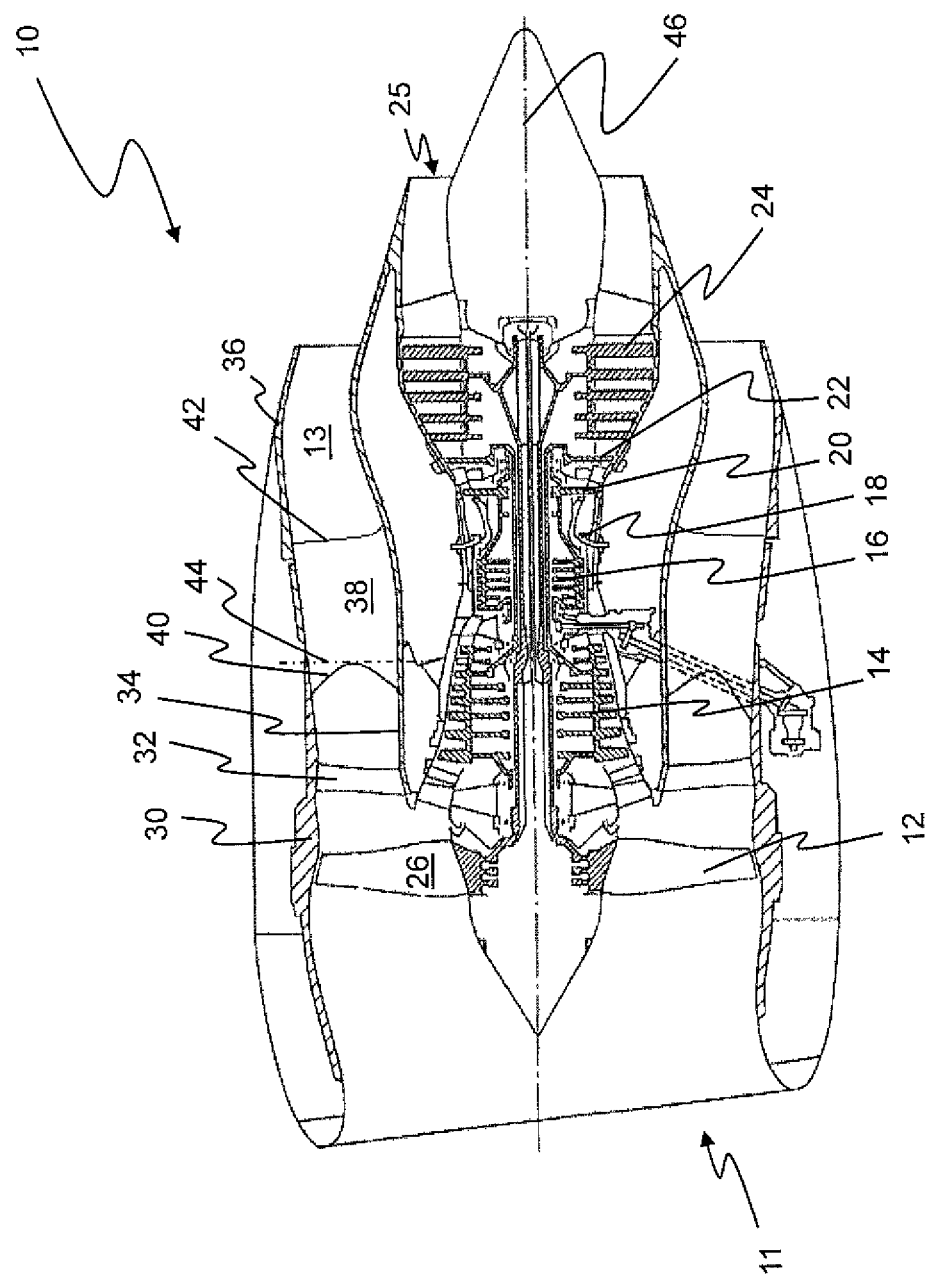
FIG. 3 illustrates a cross section of a gas turbine engine.

With reference to FIG. 3 a bypass gas turbine engine is indicated at 10. The engine 10 comprises, in axial flow series, an air intake duct 11, fan 12, a bypass duct 13, an intermediate pressure compressor 14, a high pressure compressor 16, a combustor 18, a high pressure turbine 20, an intermediate pressure turbine 22, a low pressure turbine 24 and an exhaust nozzle 25. The fan 12, compressors 14, 16 and turbines 20, 22, 24 all rotate about the major axis of the gas turbine engine 10 and so define the axial direction of the gas turbine engine.

Air is drawn through the air intake duct 11 by the fan 12 where it is accelerated. A significant portion of the airflow is discharged through the bypass duct 13 generating a corresponding portion of the engine thrust. The remainder is drawn through the intermediate pressure compressor 14 into what is termed the core of the engine 10 where the air is compressed. A further stage of compression takes place in the high pressure compressor 16 before the air is mixed with fuel and burned in the combustor 18. The resulting hot working fluid is discharged through the high pressure turbine 20, the intermediate pressure turbine 22 and the low pressure turbine 24 in series where work is extracted from the working fluid. The work extracted drives the intake fan 12, the intermediate pressure compressor 14 and the high pressure compressor 16 via shafts. The working fluid, which has reduced in pressure and temperature, is then expelled through the exhaust nozzle 25 generating the remainder of the engine thrust.

In the present application, an axial direction refers to a direction along the longitudinal axis defined by the major axis of the gas turbine engine. A radial direction refers to a direction extending perpendicular to the axial direction; a radial inward direction is towards the major axis of the gas turbine engine and a radial outward direction is away from the major axis of the gas turbine engine.

The intake fan 12 comprises an array of radially extending fan blades 26 that are mounted to the shaft. The intake fan 12 is circumferentially surrounded by a structural member in the form of a fan casing 30. Outlet guide vanes (OGVs) 32 are positioned downstream of the intake fan 12. In the present embodiment the OGVs support the fan casing, but in alternative embodiments, the OGVs may not provide such a supporting function (e.g. in smaller engines). The OGVs are primarily provided to straighten the flow from the intake fan 12. A series of OGVs are provided in the bypass duct 13 and are spaced circumferentially around the engine core. An inner casing 34 and an outer casing 36 (part of which is defined by the fan casing 30) define the bypass duct 13, and the OGVs extend from the inner casing to the outer casing.

A bifurcation 38, in this embodiment two diametrically opposed bifurcations, are positioned downstream of the OGVs. The bifurcation is provided for mounting of the outer casing 36 and also for the purpose of encasing and directing electrical connections.

The bifurcation 38 has a leading edge 40 and a trailing edge 42. The bifurcation has an aerofoil shape. That is, the bifurcation 38 has two axial sides extending between the leading and the trailing edge, the two axial sides being connected by a curved surface in the region of the leading edge. The bifurcation extends between the inner casing 34 and the outer casing 36, so as to extend between the core and a pylon (not shown) that connects the engine to the wing. In this way electrical components can be efficiently routed to the engine.

FIG. 3 illustrates a datum line 44. The datum line 44 is a straight line that extends directly radially from the inner casing to the outer casing, or in other words substantially perpendicular to a longitudinal axis 46 of the engine, at a rearward-most position along the leading edge of the bifurcation.

The leading edge 40 of the bifurcation 38 is profiled or shaped so as to protrude axially forward by a varying distance along the radial extent of the bifurcation. The profile of the bifurcation is such that the axial distance from the datum line 44 to a point on the leading edge varies from the inner casing 34 to the outer casing 36. In the present example, the chordal length of the bifurcation varies from a position adjacent the inner casing to a position adjacent the outer casing.

Figure 4A:
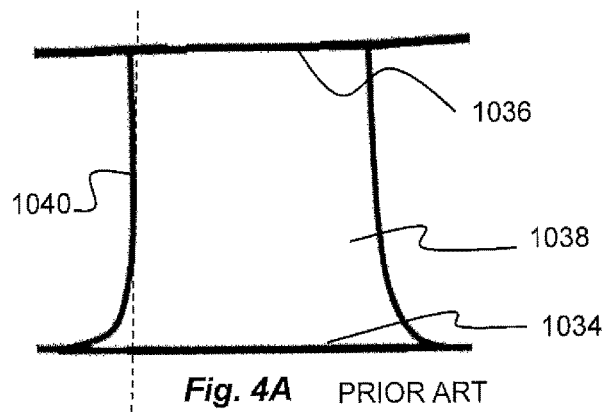
FIG. 4A illustrates a side view of a bifurcation of the prior art.
Figure 4B:
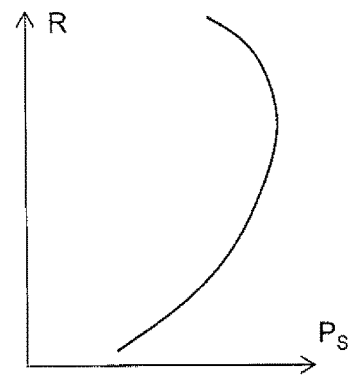
FIG. 4B illustrates a graph showing the variation of static pressure with radius for the bifurcation of FIG. 4A.
Figure 5A:
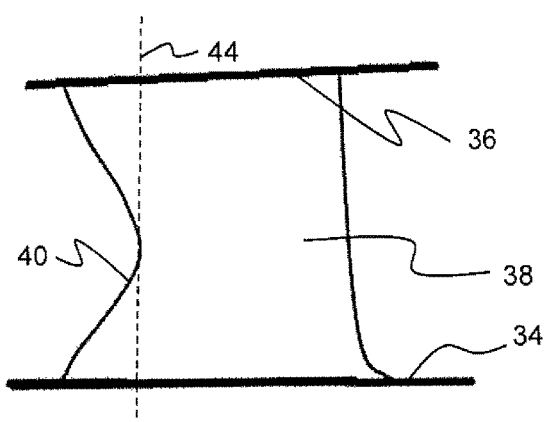
FIG. 5A illustrates a side view of a bifurcation of FIG. 3.
Figure 5B:
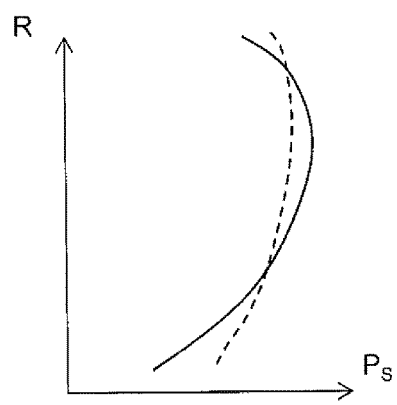
FIG. 5B illustrates a graph showing a dotted line that indicates the variation of static pressure with radius for the bifurcation of FIG. 5A and a solid line that indicates the variation in static pressure with radius for a bifurcation of the prior art.

Referring now to FIGS. 5A and 5B the shape of the bifurcation 38 will be described in more detail, with reference to a bifurcation 1038 of the prior art illustrated in FIG. 4A. The bifurcation 1038 of the prior art includes a leading edge 1040 that extends substantially directly from the inner casing to the outer casing, all except a region directly adjacent the inner casing. The region adjacent the inner casing deviates by a small amount from the straight so as to facilitate connection to the inner casing. This region has not been seen to affect the static pressure distribution. As such, the chordal length of the bifurcation is substantially constant along the length of the bifurcation. Referring to FIG. 4B, radius R is shown on the y-axis and static pressure $P_s$ is shown on the x-axis. As is shown in FIG. 4B, at positions adjacent the inner casing 1034 and the outer casing 1036 the static pressure is a minimum, and in a region between the inner and outer casing the static pressure is a maximum.

As discussed previously, the bifurcation 38 of the present embodiment includes a profiled leading edge 40. As shown in more detail in FIG. 5A as an example, the leading edge is profiled such that the chordal length of the bifurcation is a maximum in the positions where minimum static pressure would be expected, in this embodiment that is in the region adjacent the inner casing and the in the region adjacent the outer casing. The chordal length is a minimum in the region between the inner and the outer casing. The chordal length is a maximum at the positions adjacent the inner and outer casing, that is the positions where maximum static pressure would be expected. That is, moving radially outwardly from the inner casing, the chordal length of the bifurcation starts at a maximum and then starts to decrease until a minimum is met mid-way between the inner and outer casing. The chordal length of the bifurcation then starts to increase until again reaching a maximum at a position adjacent the outer casing.

The leading edge 40 may be described as defined by a convex curve adjacent the inner and outer casing and a concave curve mid-way between the inner and outer casing.

The improved static pressure distribution is shown in FIG. 5B as a dashed line, with the static pressure $P_s$ being shown on the x-axis and the radius R being shown on the y-axis. The scaling of FIGS. 4B and 5B is similar, and a comparison of these two graphs shows that changing the profile of the bifurcation changes the static pressure distribution so that it is more uniform. As can be seen in FIG. 5B, utilising the radial distribution of convex and concave curvatures along the leading edge of the bifurcation can modify the global amplitude and radial distribution of the static pressure profile just upstream of the bifurcation leading edge.

The more uniform static pressure distribution resulting from the profiling of the bifurcation leading edge reduces the forcing applied to the fan blades and therefore reduces the undesirable vibration of the fan blades. Since this reduction in forcing has been achieved by profiling the bifurcation the outlet guide vanes can be arranged for optimal aerodynamic performance.

A specific profiling of the bifurcation 38 has been described, but in alternative embodiments the profiling may be different to that described. For example, the optimal profiling of the bifurcation can be selected using modeling techniques known in the art to identify where the regions of maximum static pressure will be when no profiling is applied. The leading edge can then be profiled so as to have a maximum distance from the datum line and/or maximum chordal length in the region of minimum static pressure or may be profiled so as to reduce the excitation of the predominant mode shapes of the rotor blade.

Figure 5C:
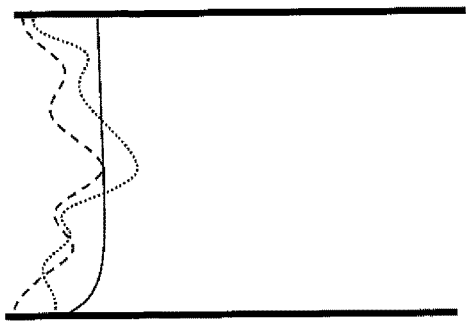
FIG. 5C illustrates a side view of two alternative bifurcations of the present disclosure the dotted lines indicating the profile of the leading edge of each of the two bifurcations, a solid line indicates the profile of the leading edge of the bifurcation of the prior art for comparison.
Figure 5D:
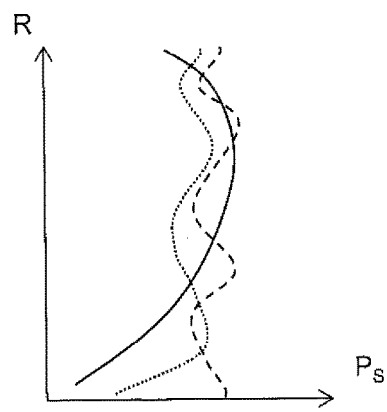
FIG. 5D illustrates a graph showing the variation of static pressure with radius for the bifurcations of FIG. 5C, the dotted lines indicate the static pressure for the bifurcations of the present disclosure and the solid line indicates the static pressure for a bifurcation of the prior art.

FIG. 5C illustrates two further examples of how the leading edge can be profiled. Similar principles of design are applied as for the example of FIG. 5A, but the profile of the leading edge is optimised so as to specifically target reduction in excitation of critical modes of vibration. Referring to FIG. 5D, to design the leading edge of the bifurcations of FIG. 5C, computational methods are used to define a leading edge profile that optimises and tailors the complex radial distribution of static pressure that results from the presence of the bifurcation. When the optimised pressure profile is transferred through the OGV passages, the radial static pressure profile can reduce the excitation of the most critical mechanical eigen-mode shapes of the fan rotor blade.

Various options for the profiling of the leading edge have been described. The skilled person will understand that these are only examples of the possible profile that can be applied to the leading edge. Generally, the radial shape of the bifurcation leading edge can be defined by a spline passing through 3 or more, e.g. equal to or up to 10 radial nodes (2 radial nodes would define a linear leading edge) with a uniform or non-uniform distribution of chordal protrusions. The chordal protrusions can protrude by a distance up to or equal to 40% of the radial height of the bifurcation, e.g. equal to or greater than 5%, 10%, 15% or 20%.

It will be appreciated by one skilled in the art that, where technical features have been described in association with one or more embodiments, this does not preclude the combination or replacement with features from other embodiments where this is appropriate. Furthermore, equivalent modifications and variations will be apparent to those skilled in the art from this disclosure. Accordingly, the exemplary embodiments of the invention set forth above are considered to be illustrative and not limiting.

The invention claimed is:

1. A gas turbine engine comprising:
a fan;
a bypass duct positioned downstream of the fan and defined by an inner casing and an outer casing;
a series of outlet guide vanes arranged downstream of the fan, the outlet guide vanes extending between the inner casing and the outer casing of the bypass duct; and
a bifurcation positioned downstream of the outlet guide vanes and extending between the inner casing and the outer casing, wherein the bifurcation comprises a leading edge, and
wherein the leading edge of the bifurcation is defined by a first convex region that extends from the inner casing, a second convex region that extends from the outer casing, and a concave region between the first convex region and the second convex region, the leading edge of the bifurcation having a spanwise curvature such that the leading edge of the bifurcation protrudes axially forward by a varying distance along the radial extent of the leading edge so as to modify a static pressure field formed, in use, immediately upstream of the bifurcation; and
wherein the first convex region and the second convex region are axially forward of a datum line, the datum line being a straight line that extends radially from the inner casing to the outer casing perpendicular to the longitudinal axis of the engine at a rearward-most position along the leading edge.

2. The gas turbine engine according to claim 1, wherein the leading edge of the bifurcation is profiled such that the distance the leading edge axially protrudes from the datum line varies according to a static pressure formed immediately upstream of another bifurcation having a leading edge extending straight along a circumferentially-spaced datum line.

3. The gas turbine engine according to claim 1, wherein the leading edge of the bifurcation is profiled so as to protrude axially forward by a maximum distance in regions where a static pressure immediately upstream of another bifurcation having a leading edge extending straight along a circumferentially-spaced datum line is a minimum.

4. The gas turbine engine according to claim 1, wherein the leading edge of the bifurcation is profiled so as to protrude axially forward by a minimum distance in regions where a static pressure immediately upstream of another bifurcation having a leading edge extending straight along a circumferentially-spaced datum line is a maximum.

5. The gas turbine engine according to claim 1, wherein the leading edge of the bifurcation is profiled so as to protrude axially forward by a maximum distance at a position adjacent the inner casing and the outer casing.

6. The gas turbine engine according to claim 1, wherein the leading edge of the bifurcation is profiled so as to protrude axially forward by a minimum distance at a radially central region of the bifurcation.

7. The gas turbine engine according to claim 1, wherein a radial shape of the bifurcation is defined by a spline passing through equal to or between 3 and 10 radial nodes of a uniform or non-uniform distribution of protrusions in a chordal direction.

8. The gas turbine engine according to claim 7, wherein the protrusions in the chordal direction protrude approximately by a distance of 5% to 40% of the radial height of the bifurcation.

9. A gas turbine engine comprising:
a fan;
a bypass duct positioned downstream of the fan and defined by an inner casing and an outer casing;
a series of outlet guide vanes arranged downstream of the fan, the outlet guide vanes extending between the inner casing and the outer casing of the bypass duct; and
a bifurcation positioned downstream of the outlet guide vanes and extending between the inner casing and the outer casing, wherein the bifurcation comprises a leading edge defined by a first convex region that extends from the inner casing, a second convex region that extends from the outer casing, and a concave region between the first convex region and the second convex region, and
wherein the leading edge of the bifurcation is profiled such that a chordal length of the bifurcation varies from the inner casing to the outer casing of the bifurcation between a plurality of maxima and one or more minima.

10. The gas turbine engine according to claim 9, wherein the leading edge of the bifurcation is profiled such that the distance the leading edge axially protrudes from a datum line varies according to a static pressure formed immediately upstream of another bifurcation having a leading edge extending straight along a circumferentially spaced datum line.

11. The gas turbine engine according to claim 9, wherein the leading edge of the bifurcation is profiled so as to protrude axially forward by a maximum distance in regions where a static pressure immediately upstream of another bifurcation having a leading edge extending straight along a circumferentially-spaced datum line is a minimum.

12. The gas turbine engine according to claim 9, wherein the leading edge of the bifurcation is profiled so as to protrude axially forward by a minimum distance in regions where a static pressure immediately upstream of another bifurcation having a leading edge extending straight along a circumferentially-spaced datum line is a maximum.

13. The gas turbine engine according to claim 9, wherein the leading edge of the bifurcation is profiled so as to protrude axially forward by a maximum distance at a position adjacent the inner casing and the outer casing.

14. The gas turbine engine according to claim 9, wherein the leading edge of the bifurcation is profiled so as to protrude axially forward by a minimum distance at a radially central region of the bifurcation.

15. The gas turbine engine according to claim 9, wherein a radial shape of the bifurcation is defined by a spline passing through equal to or between 3 and 10 radial nodes of a uniform or non-uniform distribution of protrusions in a chordal direction.

16. The gas turbine engine according to claim 15, wherein the protrusions in the chordal direction protrude approximately by a distance of 5% to 40% of the radial height of the bifurcation.

\* \* \* \* \*